(12) United States Patent
Bauchot et al.

(10) Patent No.: US 8,015,251 B2
(45) Date of Patent: Sep. 6, 2011

(54) METHOD AND SYSTEM FOR SELECTIVELY REQUESTING AN ACKNOWLEDGEMENT TO RECIPIENTS OF AN ELECTRONIC MAIL

(75) Inventors: Frederic Bauchot, Saint-Jeannet (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 11/585,383

(22) Filed: Oct. 24, 2006

(65) Prior Publication Data
US 2007/0094339 A1  Apr. 26, 2007

(30) Foreign Application Priority Data
Oct. 25, 2005   (EP) ..................................... 05300852

(51) Int. Cl.
*G06F 15/16* (2006.01)
(52) U.S. Cl. ......... 709/206; 709/203; 709/224; 709/246
(58) Field of Classification Search ................. 709/206, 709/207, 203, 224, 246; 358/402
See application file for complete search history.

(56) References Cited

U.S. PATENT DOCUMENTS

| 5,057,935 | A | * | 10/1991 | Williams | 358/402 |
| 6,108,688 | A | * | 8/2000 | Nielsen | 709/206 |
| 6,247,045 | B1 | * | 6/2001 | Shaw et al. | 709/207 |
| 6,782,414 | B1 | * | 8/2004 | Xue et al. | 709/206 |
| 7,020,688 | B2 | * | 3/2006 | Sykes, Jr. | 709/206 |
| 7,085,812 | B1 | * | 8/2006 | Sherwood | 709/206 |
| 7,088,993 | B2 | * | 8/2006 | Dumont et al. | 455/412.2 |
| 2002/0013817 | A1 | * | 1/2002 | Collins et al. | 709/206 |
| 2007/0153329 | A1 | * | 7/2007 | Sugawara et al. | 358/402 |

FOREIGN PATENT DOCUMENTS
EP          0371605       10/1989
WO          WO03069836    8/2003

* cited by examiner

*Primary Examiner* — Ramy M Osman
(74) *Attorney, Agent, or Firm* — George R. McGuire; Blaine T. Bettinger; Bond Schoeneck & King

(57) ABSTRACT

The present invention provides a method, system and computer program in a client side of an electronic mail management application, for selectively requesting a read mail acknowledgment to one or a plurality of recipients of a mail among a plurality of recipients.

20 Claims, 7 Drawing Sheets

METHOD AND SYSTEM FOR SELECTIVELY REQUESTING AN ACKNOWLEDGEMENT TO RECIPIENTS OF AN ELECTRONIC MAIL

CLAIM OF PRIORITY

The present application claims priority to European Patent Application Number 05300852.0, filed Oct. 25, 2005, the content of which is hereby incorporated by reference.

FIELD OF THE INVENTION

The present invention relates to the field of electronic mail and more particularly to a method, system and computer program for permitting selective requests of an acknowledgment to less than all recipients of an electronic mail message.

BACKGROUND OF THE INVENTION

The first electronic mail systems used file transfer protocols where the recipient's address was in the first line of the message sent as a file. More elaborate electronic mail systems have been defined and described in the RFC (Request For Comments) documents. Mail transmission protocols have been standardized such as the Simple Mail Transfer Protocol (SMTP), RFC 2821 and the Internet Message Format RFC 2822. According to the SMTP model, the sender of a message provides in addition to the normal text, additional information which are sent in the header of the message. The author of the mail indicates:
- a sender address ('From:' field in the mail header),
- a recipient address which may be the address of final recipient ('To:' field),
- the address of the people in copy ('Cc:' field), and
- the address of people in 'Blind Carbon Copy' ('Bcc:' field).

The "Bcc:" field comprises the address of the recipients of the message whose address must not be revealed to the other recipients of the message. There are three ways in which the "Bcc:" field is used (refer to RFC2822 Internet Message Format):
- In the first case, when a message comprising a "Bcc:" field is prepared to be sent, the "Bcc:" line is removed even though all of the recipients (including those specified in the "Bcc:" field) are sent a copy of the message.
- In the second case, a copy of the message with the "Bcc:" line removed as above, is sent to the recipients specified in the "To:" and "Cc:" lines. However, the recipients on the "Bcc:" line get a separate copy of the message with a "Bcc:" line (When there are multiple recipient addresses in the "Bcc:" field, in some implementations, the "Bcc:" line comprises only the address of the recipient).
- Finally, since a "Bcc:" field may contain no address, a "Bcc:" field can be sent without any addresses indicating to the recipients that blind copies were sent to someone.

The Simple Mail Transfer Protocol (SMTP), by introducing the recipient fields "To:", "Cc:" and "Bcc:" takes into account the need of performing two operations:
- sending a mail to one or several primary recipients ("To:" field) and officially informing other recipients of this sending (the "Cc:" field), or
- sending a mail to one or several primary recipients ("To:" field), officially informing other recipients of the sending (the "Cc:" field), and independently and unofficially informing other recipients of the sending (the "Bcc:" field).

SMTP can send mails to these three kinds or recipients without duplicating the sending operations. SMTP proposes a function for simplifying the management of the addresses, mainly based on the concept of Directories and Distribution Lists. Directories can be based either on a general shared Directory or on Local Address Books. Directories comprise distribution lists to facilitate the sending to multiple recipients. According to SMTP, a mailbox is a virtual storage entity which receives mail for a particular recipient. A distribution list allows a sender to name a group of recipients without actually providing an individual mailbox address for each recipient. When a sender creates a message, he/she puts the name of the distribution list. In case of local distribution list, the mail application operating on his/her workstation automatically expands said distribution list by replacing the distribution list name by the address of each member of the distribution list. Otherwise (If the distribution list is not local), the distribution list name is inserted in the list of recipients. The distribution list will be expanded by the MTA owner of this distribution list. So the Header of the message may comprise both a list of mail boxes address and distribution list names. The sender has the possibility to request (or not) a mail acknowledgment from the recipients.

Message senders may want to request a mail acknowledgment only from a subset of recipients. For example the sender wants to know whether or not the main recipients ("To:" field) have read the mail and does not want to be polluted by acknowledgments returned by people in copy ("Cc:" field) or people in blind carbon copy ("Bcc:" field). With conventional mail systems, the process to meet this requirement is tedious and prone to error. The mail originator must send:
- a first mail to the recipients from whom the mail originator wants to receive an acknowledgment (said first mail including a request for an acknowledgment).
- a second mail, identical to the first one, to another list of recipients from whom the mail originator does not want to receive any acknowledgment.

This process is clearly not user friendly and has a major drawback: the recipients listed in a mail for which an acknowledgment has been requested, are not aware of all the recipients of this mail. In particular they are not aware of the recipients for whom no acknowledgment has been requested (and vice versa). Consequently a reply to all recipients sent by a recipient of an acknowledged mail, will not be received by all the recipients, and in particular will not be received by the recipients for whom no acknowledgment has been requested.

Thus, there is a need in current mail systems, to facilitate the operation of requesting an acknowledgment when this acknowledgment is requested only for a part of the recipients.

SUMMARY OF THE INVENTION

It is an object of the present invention to provide a system, method and computer program as defined in independent claims, for sending an electronic mail for which:
- no acknowledgment is requested for a first list of recipients, and
- an acknowledgment is requested for a second list of recipients.

More particularly, the present invention is directed to a method for selectively requesting an acknowledgment to recipients of a mail.

The method in a client side of a mail management application, for selectively requesting a read mail acknowledgment to one or a plurality of recipients of a mail among a plurality of recipients, comprises the steps of:

receiving a user's command to send a mail, the mail comprising a body and a list with all recipients;

receiving one or a plurality of user's commands for selecting among the list of all recipients, recipients for whom a read mail acknowledgement is requested and recipients for whom no read mail acknowledgement is requested;

building a list of recipients for whom a read mail acknowledgement is requested; and building a list of recipients for whom no read mail acknowledgement is requested;

If the lists of recipients previously built are not both empty:
duplicating the mail;

associating with an exemplar of the duplicated mail an indicator for requesting a read mail acknowledgement and sending the exemplar to the one or plurality of recipients for whom a read mail acknowledgement is requested;

sending another exemplar of the duplicated mail to the one or plurality of recipients for whom no read mail acknowledgement is requested.

The foregoing, together with other objects, features, and advantages of this invention will in part be obvious, and in part be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

The following description is presented to enable one or ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

PRINCIPLES OF THE INVENTION

The present invention allows to selectively request an acknowledgment to some recipients and not to other recipients of an electronic mail.

The present invention is very simple to implement as only the client mail application (called "User Agent" in the SMTP environment) of the sender is modified. The implementation is transparent for:

the mail server application, the local Mail Transfer Agent, in charge of transferring electronic mail messages over the network according to the SMTP, and the client mail application of the recipient.

SMTP Model

Figure 1:
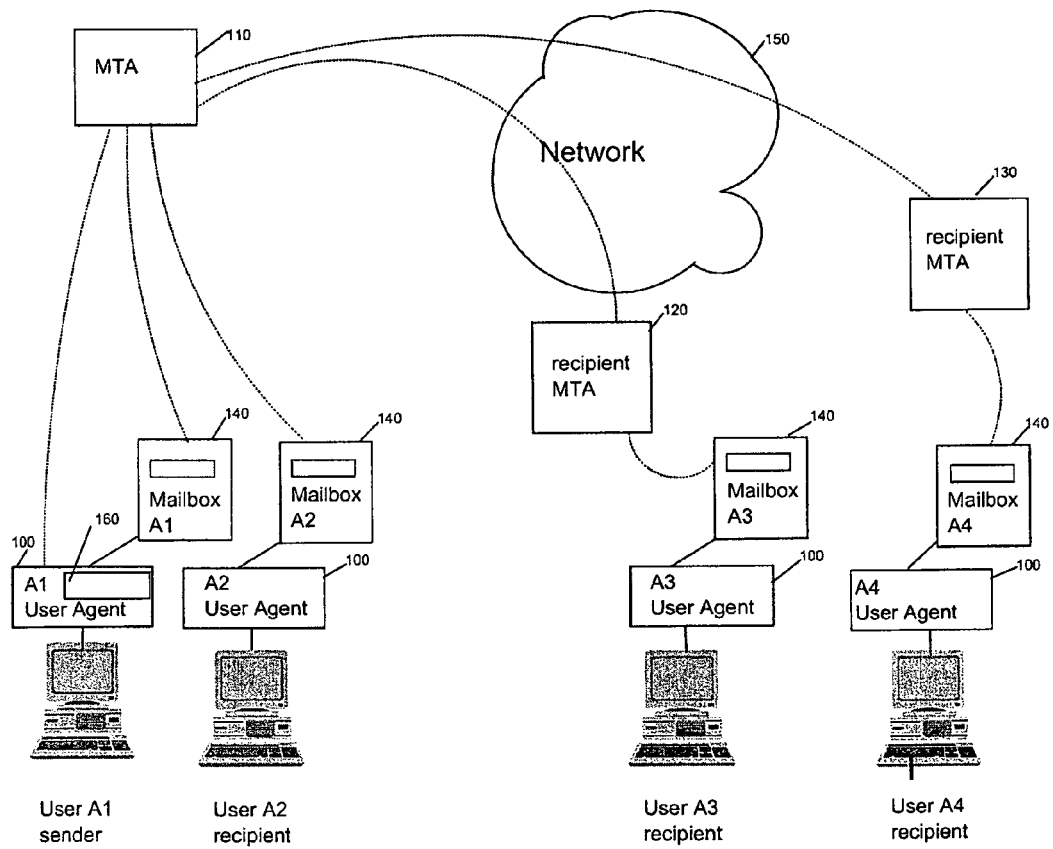
FIG. 1 illustrates the Simple Mail Transfer Protocol (SMTP) model.

FIG. 1 illustrates the SMTP model and the computing environment of the preferred embodiment of the present invention. The SMTP model for distributing electronic mails according to the prior art is defined in the Request For Comments RFC 2821. The User Agents (100) operating in the user workstations act as clients for their respective mail servers (110,120,130) (the so called Mail Transfer Agents (MTAs)). The User Agents A1 and A2 are connected to the same MTA (110). The User Agents A3 and A4 are connected to their respective MTAs (120, 130). The MTAs are in charge of managing the recipient mail addresses for sending and receiving mails either to or from the local User Agents. The local User Agents (A1, A2) are connected to a local MTA (110) or over the Internet network (150) to remote MTAs (120, 130). The remote MTAs transfer and receive mails either to or from the local User Agents (A3 and A4) connected to them. The User Agent sends a mail to its local MTA. This mail comprises the data itself and the name of the recipients. To deliver a mail to a local User Agent, the MTA looks for the addresses of the recipients and puts the mail in a mail repository (the mailbox (140) of the User Agent receiving the mail). The sender and recipient names correspond to the mailboxes of the senders and recipients.

According to the preferred embodiment of the present invention, a particular logical function (160) is added to the mail client application (100) implementing SMTP. By means of this additional function, a User A1, starting from a unique message text, can selectively request a mail acknowledgment for an electronic mail sent to several recipients (User A2, User A3 and/or User A4).

Client Mail Application

Figure 2:
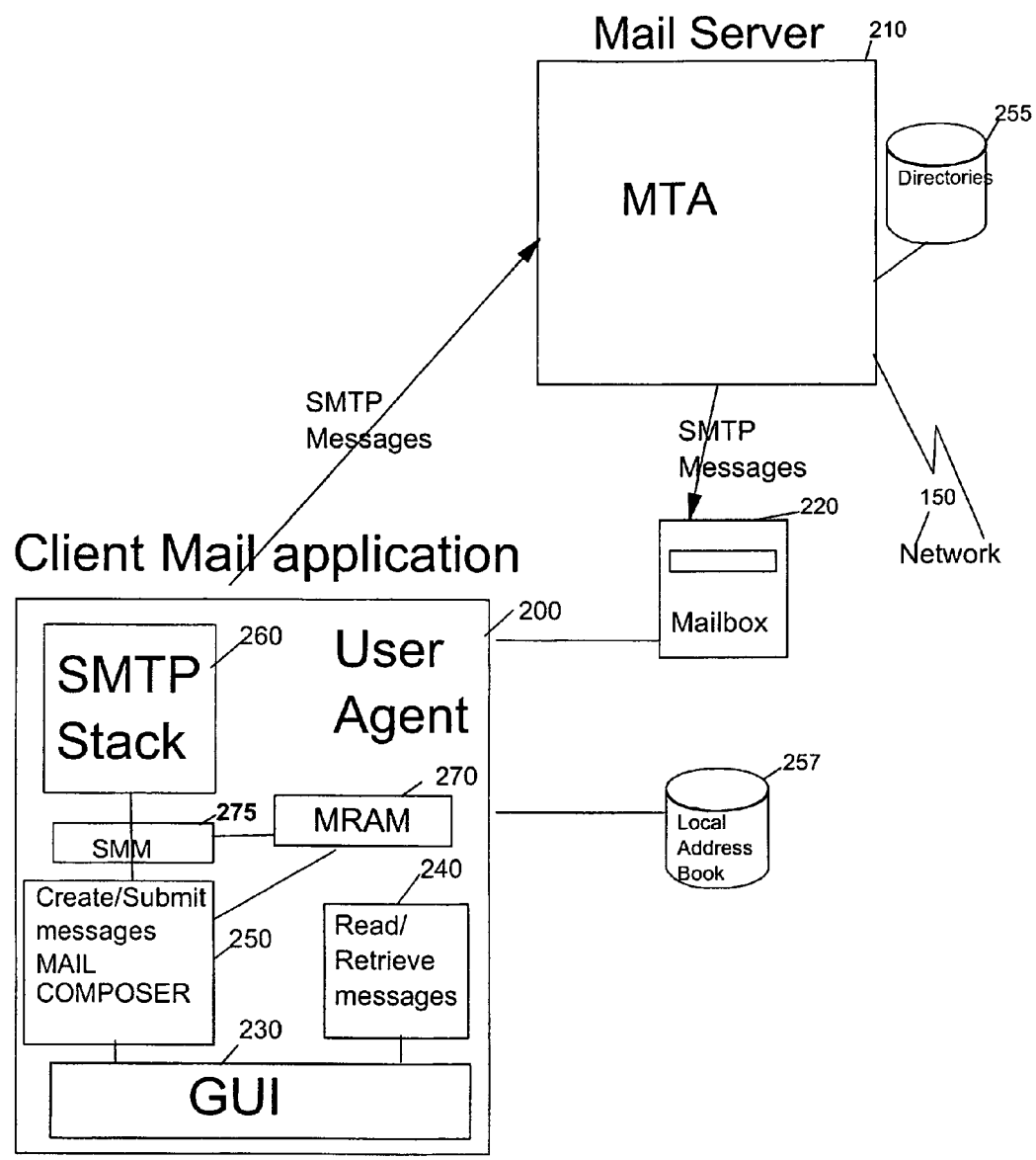
FIG. 2 is a logical view of the client mail application according to the preferred embodiment of the present invention.

FIG. 2 shows in detail the logical function added to the Client Mail Application according to the preferred embodiment of the present invention. To send and receive electronic mails, the Client Mail application (200) comprises a User Agent including a Graphical User Interface (GUI) (230) and the following main functions:

- A "Create Message" function (250). This function is used to compose by means of an editor, the mail and the distribution list. This function has access to:
  - Directories stored by the local or remote MTA (255), or
  - Directories from the Local Address Book (257) (which is the local space of the user).
- A "Submit Message" function (250). This function translates the message compliant with the "Internet Message Format" RFC2822. The the body part of the mail is coded in a MIME (Multipurpose Internet Mail Extensions) format (refer to RFC2045, RFC2046 and RFC2049).
- A SMTP Stack (260) receives the message formatted by the "Submit Message" function This formatted message is ready to be submitted to the MTA via SMTP.
- A "Read/retrieve Messages" function (240). This function is used to have access to the messages stored in the Mailbox (220). The messages are stored as described in the RFC2822.

New SMTP Layer

In the standard process, SMTP sends the mail to one list of recipients (the "To:", "Cc:" and "Bcc:" recipients). In the present invention, a new SMTP layer sends the mail to recipients specified in 2 distinct lists:

- one recipient list for mail with acknowledgement; and
- another recipient list for mail without acknowledgement.

According to the present invention:

- The Mail Read Acknowledge Management (MRAM) component (270) belongs to the generic Mail Composer (250) (itself part of the User Agent). The MRAM allows the author of a mail to create up to two distribution lists from the recipients specified within the mail:
  - a list for the recipients for whom a read acknowledgment is requested, and
  - another list for the other recipients for whom no read acknowledgment is requested.
- The Send Mail Manager (SMM) (275) generates and formats the electronic mail corresponding to each recipient list created by the MRAM. These two mails and the distribution lists will be sent to the local MTA (210) by means of the SMTP stack (260).
- The new programming layer of the SMTP stack (260) receives the duplicated mail sent by the SMM (275). The SMM sends also, in addition to the mail with the list of all recipients,
  - the list for the recipients for whom a read acknowledgment is requested, and
  - the list for the other recipients for whom no read acknowledgment is requested. as they have been prepared by the MRAM.

With this new programming layer (260), the SMTP stack, instead of sending the mail to the recipient list read inside the mail, sends two identical mails, each mail being associated with one of the recipient lists prepared by the MRAM and one mail being associated with an indicator for requesting a read mail acknowledgement. Each mail includes a recipient list comprising all the recipients specified by the mail originator in the "To:", "Cc:" and "Bcc:" fields.

Note: according to the Requests For Comments (RFC's) used for the implementation of mail clients (in particular "RFC2822 Internet Message Format" and "RFC2298 An Extensible Message Format for Message Disposition Notifications") the two mails have a different header. The header of the mail associated with the list of recipients for whom a read mail acknowledgement is requested includes an indicator for requesting for a read mail acknowledgement.

In a preferred embodiment, the SMTP stack which is in charge in the User Agent of sending the mails previously prepared through the GUI (Graphical User Interface) and the Create/Submit function, is modified by the new programming layer (260). This new programming layer prepares for the SMTP stack, the new recipient lists to which the mail will be sent. The normal process, as defined in the SMTP protocol, which consists in reading the recipient list inside the mail is by-passed. The new process requires a modification of the SMTP protocol defining the SMTP stack.

MRAM Graphical Interface

Figure 3A:
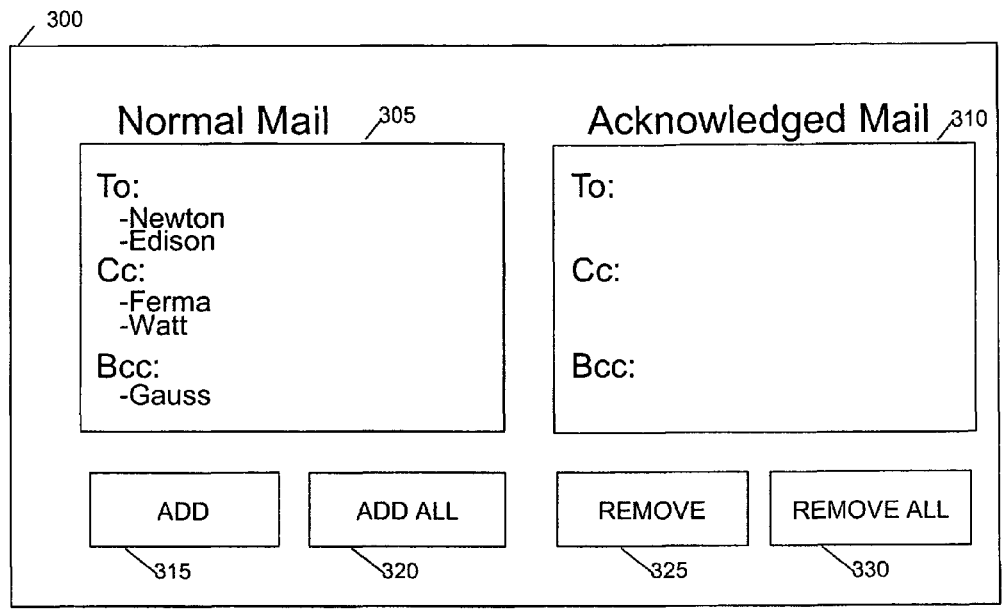
FIG. 3A shows the initial state of the "Mail Read Acknowledge Management" GUI (Graphical User Interface) according to the preferred embodiment of the present invention.

FIG. 3A shows the MRAM GUI (Graphical User Interface). When a mail originator requests an acknowledgment using conventional means implemented in the mail User Agent (e.g. by pressing a button), a window is displayed (300). The function of the MRAM according to the present invention is to create one or two lists of recipients:

- the first list is for recipients for whom no read mail acknowledgment is requested; and
- the second list is for recipients for whom a read mail acknowledgment is requested.

The Graphical User Interface window comprises two sub windows:

- the first sub window (305) comprises the list of recipients for whom an acknowledgment is not requested,
- the second window (310) comprises the list of recipients for whom an acknowledgment is requested.

Each sub windows comprises three groups of users which are respectively identified as follows:

"To:" for the main recipients,
"Cc:" for the persons in copy, and
"Bcc:" for the persons in blind copy.

Moreover two buttons are associated with each sub window:

- The buttons "ADD" (315) and "ADD ALL" (320) are associated with the normal mail sub window to move one, several or all users in the Acknowledged Mail sub window.
- The buttons "REMOVE" (325) and "REMOVE ALL" (330) are associated with the Acknowledged Mail sub window to remove one, several or all users from the Acknowledged Mail sub window, moving them in the normal mail sub window.

In the preferred embodiment, the first time the MRAM GUI (Graphical User Interface) is opened, all the recipients specified in "To;", "Cc:" and "Bcc;" are listed in the normal mail sub window.

In an alternate embodiment, all the users are listed in the Acknowledged Mail sub window. The choice to present the initial list of recipients in the normal mail or the Acknowledged Mail sub window can also be customized by the originator in the "user preference" belonging to the mail User Agent.

Figure 3B:
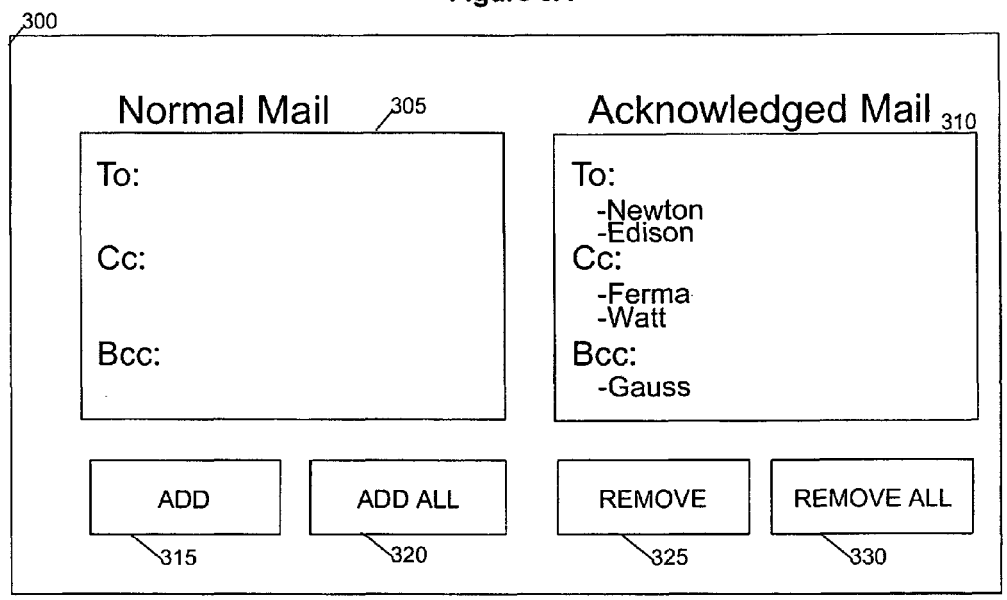
FIG. 3B illustrates the final state of the "Mail Read Acknowledge Management" GUI (Graphical User Interface) after selection of all recipients by means of the "ADD ALL" button according to the preferred embodiment of the present invention.

FIG. 3B shows the status after selecting the "ADD ALL" button. All recipients specified in the normal mail sub window ("Newton", "Edison", "Ferma", "Watt", "Gauss") (305) FIG. 3A have been moved into the Acknowledged Mail sub window (310).

Figure 3C:
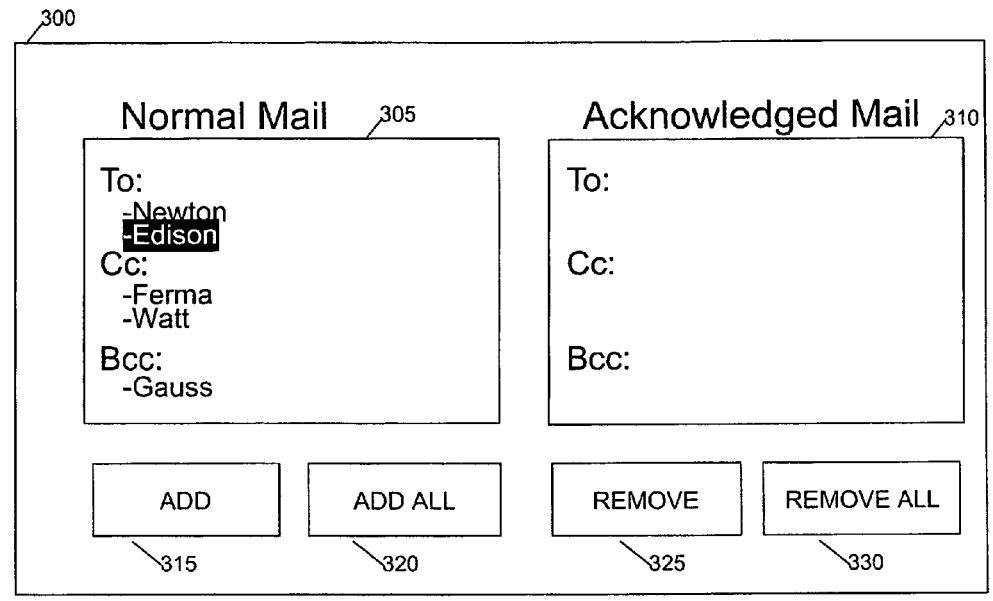
FIG. 3C shows the initial state of the "Mail Read Acknowledge Management" GUI (Graphical User Interface) and the selection of a recipient. After pressing the button "ADD", the selected recipient is moved into the "Mail Read Acknowledge Management" GUI as shown in FIG. 3D.
Figure 3D:
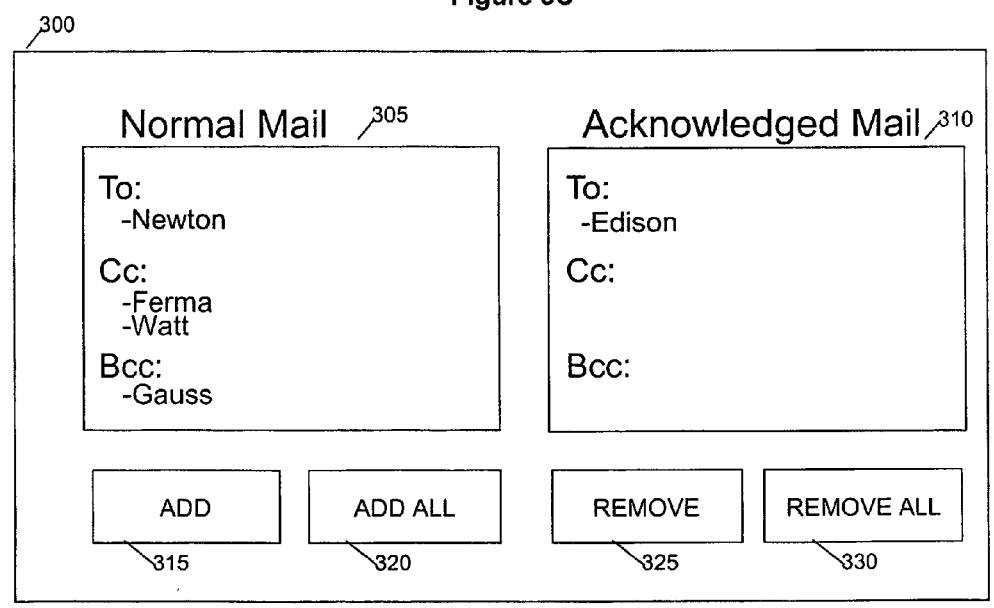
FIG. 3D illustrates the final state of the "Mail Read Acknowledge Management" GUI (Graphical User Interface) after selection of a recipient by means of the "ADD" button according to the preferred embodiment of the present invention.

FIG. 3C shows the selection of one recipient ("Edison"). After pressing the button "ADD" (315), this recipient ("Edison") is moved into the Acknowledged Mail sub window (310) as shown in FIG. 3D.

Figure 3E:
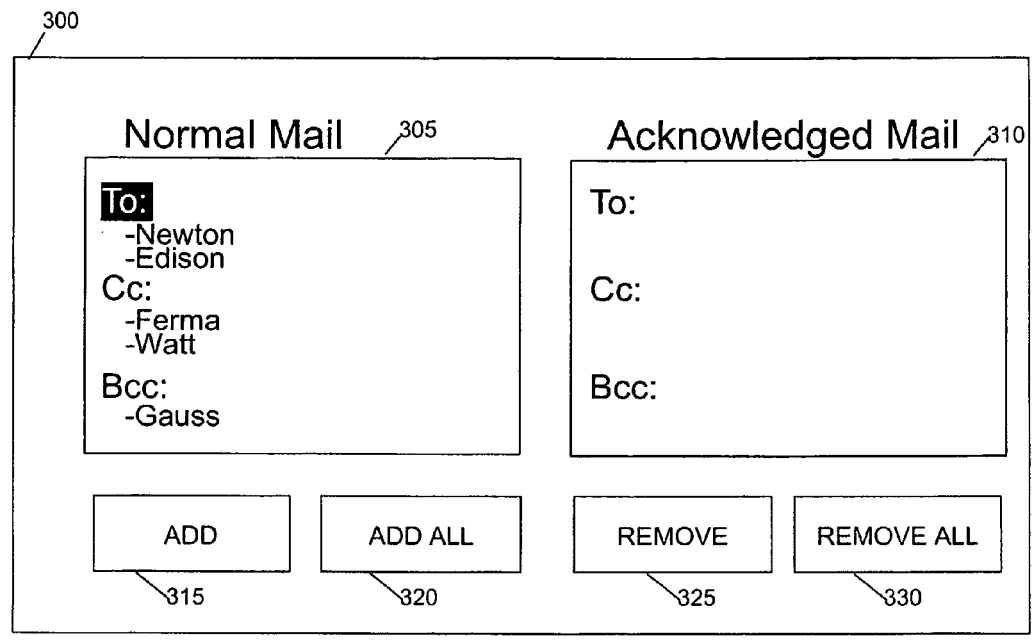
FIG. 3E shows the initial state of the "Mail Read Acknowledge Management" GUI (Graphical User Interface) and the selection of a group of recipients. After pressing the button "ADD", the selected recipients are moved into the "Mail Read Acknowledge Management" GUI as shown in FIG. 3F.
Figure 3F:
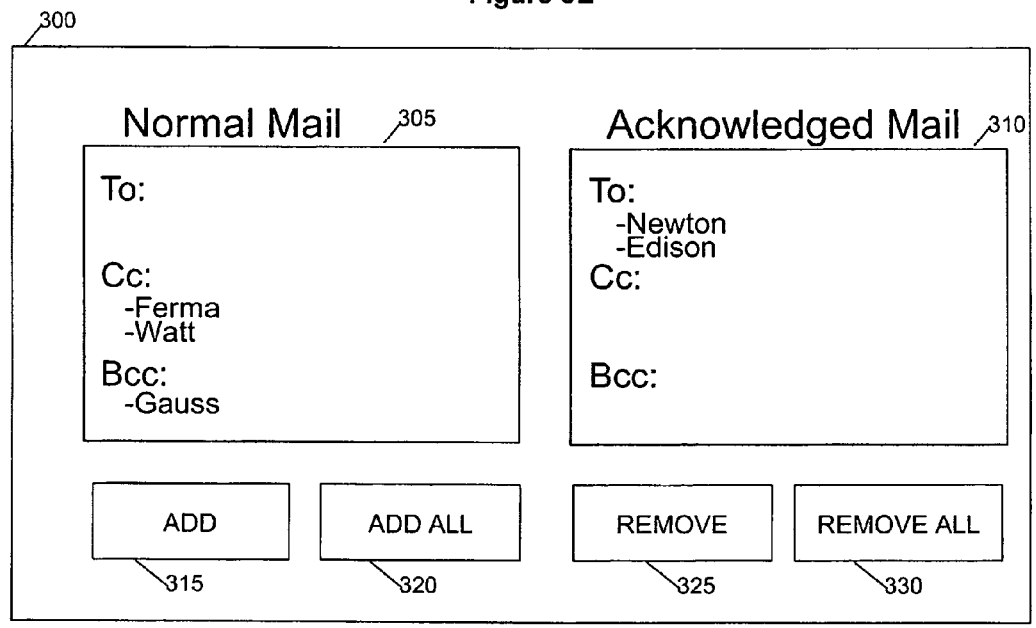
FIG. 3F illustrates the final state of the "Mail Read Acknowledge Management" GUI (Graphical User Interface) after selection of a group of recipients by means of the "ADD" button according to the preferred embodiment of the present invention.

FIG. 3E shows the selection of a group of recipients ("Newton", "Edison"). After pressing the button "ADD" (315), the selected recipients ("Newton", "Edison") are moved in the Acknowledged Mail sub window (310) as shown in FIG. 3F.

Flow Chart

Figure 4:
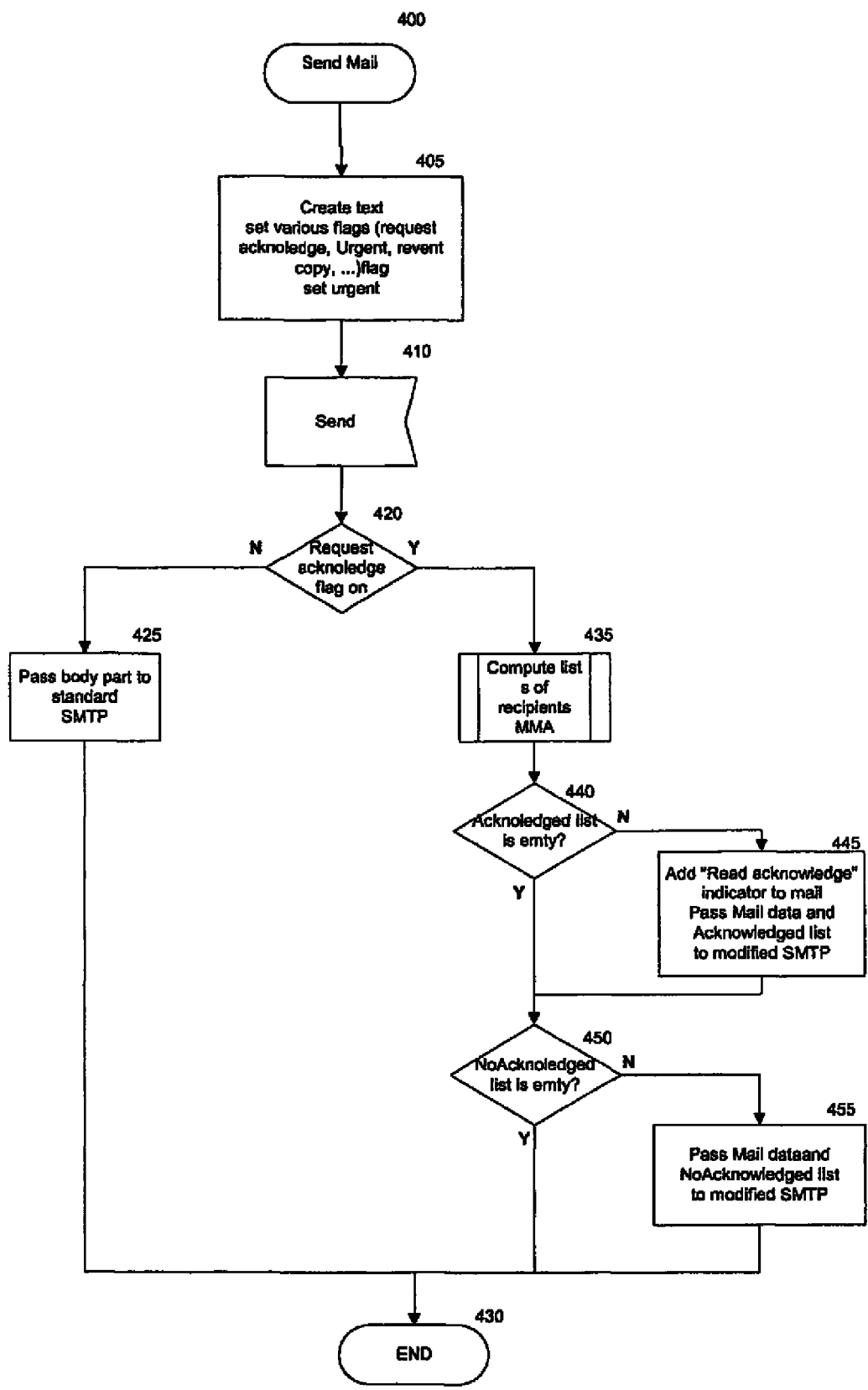
FIG. 4 is a flow chart showing the method according to the present invention.

FIG. 4 is a flow chart showing the steps of the method according to the present invention.

Step 400: When a user sends a mails, he/she first creates the body part of the mail using a text editor embedded in the mail client application. During this creation or just after, he/she also creates:
the mail recipient list (To:),
the carbon copy distribution list (Cc:) and
the blind carbon copy distribution list (Bcc:).

Step 405: The user may also set various flags to request or impose a behavior to the mail client receiver or the Mail Transfer Agent (MTA):
acknowledge mail,
urgent mail,
forbid print,
forbid forward, . . .

Step 410: Then the user press the "send" key to send the new mail to the specified recipients.

Step 420: In the preferred embodiment of the invention, the send request is passed to the Send Mail Manager (SMM) 275 which first checks whether or nor a "Read Mail Acknowledgment" has been requested.

Step 425: If no "Read Mail Acknowledgment" has been requested, the normal process continues and the mail is passed to the standard SMTP layer 425 which extracts the recipients from the mail recipient headers "To:", "Cc:" and "Bcc:" and send the mail to all recipients using the standard SMTP protocol described in RFC 2821.

Step 435: If a "Read Mail Acknowledgment" has been requested, the Mail Read Acknowledge Management (MRAM) 270 interface is invoked to build:
a list of recipients for whom a read mail acknowledgment is requested and
a list of recipients for whom a read mail acknowledgment is not requested.

Step 440: Then control is returned to SMM which checks whether or not the list of recipients for whom a read mail acknowledgment is requested, is empty.
If the list of recipients for whom a read mail acknowledgment is requested, is empty, the process continues at step 450.

Step 445: If the list of recipients for whom a read mail acknowledgment is requested, is not empty, the modified SMTP interface is invoked with the mail body in which an indicator for requesting a read mail acknowledgement has been added and the "Read Mail Acknowledge" list. The SMTP modified layer sends the mail to all recipients retrieved from the list of recipients for whom a read mail acknowledgment is requested (instead of sending the mail to all the recipients identified in the mail headers "To":, "Cc": and "Bcc:"). Then the process continues at step 450.

Step 450: The SMM checks whether or not the list of recipients for whom a read mail acknowledgment is not requested, is empty.

If the list of recipients for whom a read mail acknowledgment is not requested, is empty, the process ends. 430;

Step 455: If the list of recipients for whom a read mail acknowledgment is not requested, is not empty, the modified SMTP interface is invoked with the mail body and the list of recipients for whom recipients no read mail acknowledgement is requested. The SMTP modified layer sends the mail to all recipients retrieved from the list of recipients for whom no read mail acknowledgment is requested (instead of sending the mail to the recipients identified in the mail headers "To:", "Cc:" and "Bcc:"). Then, the process ends at step 430.

Figure 5:
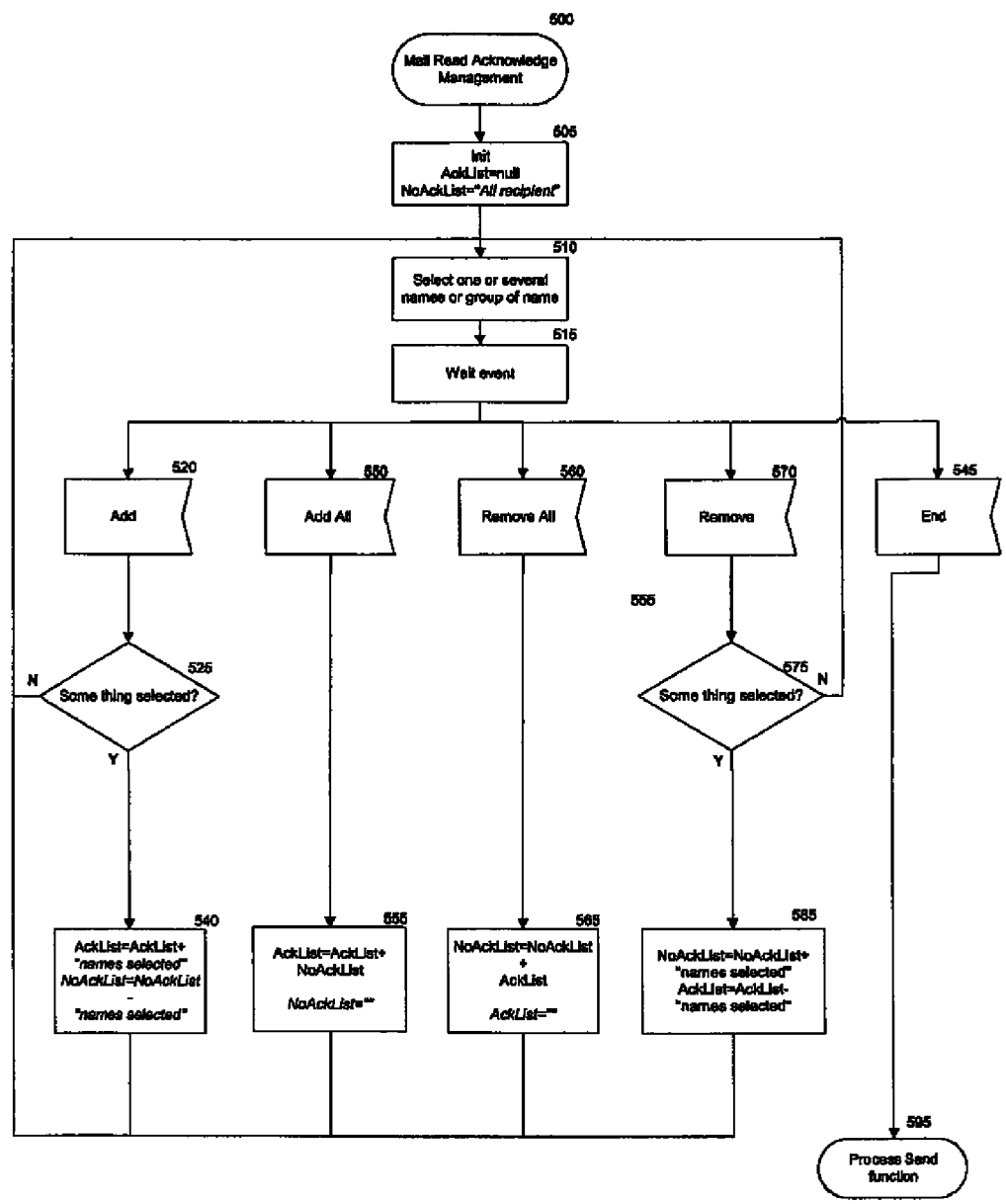
FIG. 5 is a flow chart showing the steps of creating distribution lists.

FIG. 5 is a flow chart showing the steps for creating distribution lists.

Step 500: The Mail Read Acknowledge Management 500 starts by initializing the two distribution lists.

Step 505: The list of recipients for whom a read mail acknowledgment is requested is initialized to null.
The list of recipients for whom a read mail acknowledgment is not requested is initialized with the recipients specified in the mail headers "To:", "Cc:" and "Bcc:".

Step 510: The user selects (using the mouse or a keys combination such as "Ctrl+S") one or several names or group(s) of names ("To:", "Cc:" and/or "Bcc:").

Step 515: an event generated by the selection of a key is expected. Keys ADD and ADD ALL are used to move names specified in the normal mail window 305 to the acknowledged mail window 310, while keys REMOVE and REMOVE ALL are used to move names specified in the acknowledged mail window 310 to the normal mail window 305.

Step 520: The "ADD" key has been selected.

Step 525: A checking is done to verify whether or not something has been selected in the normal mail window.
If nothing has been selected in the normal mail window, no action is taken and process loops at step 510.
If something has been selected in the normal mail window, all recipients selected or all recipients belonging to a selected group such as "To:", "Cc:" or "Bcc:", are removed from the list of recipients for whom a read mail acknowledgment is not requested in the corresponding group. Names are also moved in the graphical interface from the normal mail window in the acknowledged mail window. Then process loop at step 510.

Step 550: The "ADD ALL" key has been selected.

Step 555: All names remaining in the list of recipients for whom a read mail acknowledgment is not requested are appended to the list of recipients for whom a read mail acknowledgment is requested. The list of recipients for whom a read mail acknowledgment is not requested is set to null. Then process loop at step 510.

Step 560: The "REMOVE ALL" key has been selected.

Step 565: All names remaining in the list of recipients for whom a read mail acknowledgment is requested are appended to the list of recipients for whom a read mail acknowledgment is not requested. The list of recipients for whom a read mail acknowledgment is requested list is set to null. Then process loops at step 510.

Step 570: "The REMOVE" key has been selected.

Step 575: A checking is done to verify whether or not something has been selected in the acknowledged mail window.
If nothing has been selected, no action is taken and process loops at step 510.

If something has been selected, all recipients selected or all recipients belonging to a selected group such as "To:", "Cc:" or "Bcc:", are removed from the list of recipients for whom a read mail acknowledgment is requested and added to the list of recipients for whom a read mail acknowledgment is not requested in the corresponding group. Names are also moved in the graphical interface from the acknowledged mail window in the normal mail window. Then process loop at step 510.

Step 545: "END" key has been selected. Process is resumed and control is returned to SMM to send the mail 595.

While the invention has been particularly shown and described with reference to a preferred embodiment, it will be understood that various changes in form and detail may be made therein without departing from the spirit, and scope of the invention.

What is claimed is:

1. A method in a client side of a mail management application stored on a non-transitory computer-readable medium, for selectively requesting a read mail acknowledgment to at least one recipient of a mail among a plurality of recipients, said method comprising the steps of:
    creating a mail on a computing machine using said client side of said mail management application, said mail comprising a body and a list with all recipients of said mail;
    receiving a user's command to send said mail;
    receiving at least one of user's commands for selecting among said list of all recipients, predetermined recipients for whom a read mail acknowledgement is requested and predetermined recipients for whom no read mail acknowledgement is requested;
    building a list with said mail management application, after receiving said user's command to send said mail, of said predetermined recipients for whom a read mail acknowledgement is requested;
    building a list with said mail management application, after receiving said user's command to send said mail, of said predetermined recipients for whom no read mail acknowledgement is requested; and
    determining whether said lists of said predetermined recipients for whom a read mail acknowledgement is requested and said predetermined recipients for whom no read mail acknowledgement is requested each contain at least one recipient, and if so, then:
    duplicating the mail;
    associating with a first duplicate of the duplicated mail an indicator for requesting a read mail acknowledgement and sending said first duplicate to the one or plurality of recipients for whom a read mail acknowledgement is requested; and
    sending a second duplicate of the duplicated mail to the one or plurality of recipients for whom no read mail acknowledgement is requested.

2. The method according to claim 1 comprising the further step of:
    if the list of said predetermined recipients for whom a read mail acknowledgement is requested is empty:
    sending the mail to the one or plurality of recipients for whom no read mail acknowledgement is requested.

3. The method according to claim 2 comprising the further step of:
    if the list of said predetermined recipients for whom no read mail acknowledgement is requested is empty:
    associating with the mail an indicator for requesting a read mail acknowledgement, and
    sending said mail to the one or plurality of recipients for whom a read mail acknowledgement is requested.

4. The method according to claim 1, wherein the mail management application is based a Simple Mail Transfer Protocol (SMTP).

5. The method according to claim 1, wherein the user's commands are received by means of a Graphical User Interface (GUI).

6. The method according to claim 5, wherein the Graphical User Interface (GUI) comprises two windows, comprising:
    a normal mail window comprising the list of recipients for whom an acknowledgment is not requested;
    an acknowledged mail window comprising the list of recipients for whom an acknowledgment is requested.

7. The method according to claim 1, wherein said step of receiving at least one user's commands for selecting among said list of all recipients, recipients for whom a read mail acknowledgement is requested and recipients for whom a read mail acknowledgement is not requested, comprises the further step of:
    receiving at least one of user's commands for selecting in said list of all recipients, at least one groups of recipients for whom a read mail acknowledgement is requested and at least one groups of recipients for whom a read mail acknowledgement is not requested, the list of all recipients comprising three groups of recipients:
    a group of main recipients;
    a group of recipients in copy; and
    a group of recipients in blind copy.

8. The method according to claim 7, wherein each window comprises three groups of recipients:
    a group of main recipients;
    a group of recipients in copy; and
    a group of recipients in blind copy.

9. The method according to claim 8, wherein:
    means are associated with the normal mail window to move at least one recipient from the normal mail window to the acknowledged mail window;
    means are associated with the acknowledgement window to remove at least one recipient from the acknowledged mail window, and moving said recipients from the acknowledged mail window to the normal mail window.

10. A computer system for selectively requesting a read mail acknowledgment to at least one recipient of a mail among a plurality of recipients, said system comprising:
    means for receiving a user's command to send a mail, said mail comprising a body and a list with all recipients of said mail;
    means for receiving at least one of user's commands for selecting among said list of all recipients, predetermined recipients for whom a read mail acknowledgement is requested and predetermined recipients for whom no read mail acknowledgement is requested;
    means for building a list with said mail management application, after receiving said user's command to send said mail, of said predetermined recipients for whom a read mail acknowledgement is requested;
    means for building a list with said mail management application, after receiving said user's command to send said mail, of said predetermined recipients for whom no read mail acknowledgement is requested; and
    means for determining whether said lists of said predetermined recipients for whom a read mail acknowledgement is requested and said predetermined recipients for whom no read mail acknowledgement is requested each contain at least one recipient, and if so, then:

means for duplicating the mail;

means for associating with a first duplicate of the duplicated mail an indicator for requesting a read mail acknowledgement and sending said first duplicate to the one or plurality of recipients for whom a read mail acknowledgement is requested; and means for sending a second duplicate of the duplicated mail to the one or plurality of recipients for whom no read mail acknowledgement is requested.

11. The system according to claim 10 further comprising:
means for sending the mail to the at least one recipient for whom no read mail acknowledgement is requested If the list of said predetermined recipients for whom a read mail acknowledgement is requested is empty.

12. The method according to claim 11, further comprising:
means for associating with the mail an indicator for requesting a read mail acknowledgement, and
sending said mail to the one or plurality of recipients for whom a read mail acknowledgement is requested if the list of said predetermined recipients for whom no read mail acknowledgement is requested is empty.

13. The system according to claim 10, wherein the user's commands are received by means of a Graphical User Interface (GUI).

14. The system according to claim 13, wherein the Graphical User Interface (GUI) comprises two windows, comprising:
a normal mail window comprising the list of recipients for whom an acknowledgment is not requested; and
an acknowledged mail window comprising the list of recipients for whom an acknowledgment is requested.

15. A computer program stored on a non-transitory computer readable storage medium, the program comprising instructions for selectively requesting a read mail acknowledgment to at least one recipient of a mail among a plurality of recipients, said system comprising:
means for receiving a user's command to send a mail, said mail comprising a body and a list with all recipients of said mail;
means for receiving at least one of user's commands for selecting among said list of all recipients, predetermined recipients for whom a read mail acknowledgement is requested and predetermined recipients for whom no read mail acknowledgement is requested;
means for building a list with said mail management application, after receiving said user's command to send said mail, of said predetermined recipients for whom a read mail acknowledgement is requested;
means for building a list with said mail management application, after receiving said user's command to send said mail, of said predetermined recipients for whom no read mail acknowledgement is requested; and means for determining whether said lists of said predetermined recipients for whom a read mail acknowledgement is requested and said predetermined recipients for whom no read mail acknowledgement is requested each contain at least one recipient, and if so, then:

means for duplicating the mail;

means for associating with a first duplicate of the duplicated mail an indicator for requesting a read mail acknowledgement and sending said first duplicate to the at least one recipient for whom a read mail acknowledgement is requested; and means for sending a second duplicate of the duplicated mail to the at least one recipient for whom no read mail acknowledgement is requested.

16. The computer program according to claim 15 further comprising:
means for sending the mail to the at least one recipient for whom no read mail acknowledgement is requested If the list of said predetermined recipients for whom a read mail acknowledgement is requested is empty.

17. The computer program according to claim 16, further comprising:
means for associating with the mail an indicator for requesting a read mail acknowledgement, and
sending said mail to the one or plurality of recipients for whom a read mail acknowledgement is requested if the list of said predetermined recipients for whom no read mail acknowledgement is requested is empty.

18. The computer program according to claim 15, wherein the user's commands are received by means of a Graphical User Interface (GUI).

19. The computer program according to claim 18, wherein the Graphical User Interface (GUI) comprises two windows, comprising:
a normal mail window comprising the list of recipients for whom an acknowledgment is not requested; and
an acknowledged mail window comprising the list of recipients for whom an acknowledgment is requested.

20. The computer program according to claim 15, wherein said means receiving at least one user's commands for selecting among said list of all recipients, recipients for whom a read mail acknowledgement is requested and recipients for whom a read mail acknowledgement is not requested, further comprises:
means for receiving at least one of user's commands for selecting in said list of all recipients, at least one groups of recipients for whom a read mail acknowledgement is requested and at least one groups of recipients for whom a read mail acknowledgement is not requested, the list of all recipients comprising three groups of recipients:
a group of main recipients;
a group of recipients in copy; and
a group of recipients in blind copy.

* * * * *